United States Patent [19]

Kovacena et al.

[11] Patent Number: 4,551,349
[45] Date of Patent: Nov. 5, 1985

[54] BIS(PENTAFLUOROSULFUR)DIACETYLENE POLYMER THEREFROM AND PREPARATIONS THEREOF

[75] Inventors: Thomas A. Kovacena, McConnellsburg, Pa.; Ronald A. DeMarco, Fairfax; Arthur W. Snow, Alexandria, both of Va.

[73] Assignee: The United States of America as represented by the Secretary of the Navy, Washington, D.C.

[21] Appl. No.: 562,252

[22] Filed: Dec. 16, 1983

[51] Int. Cl.[4] .................. C23L 11/00; C08F 12/30; C08F 112/30; C08F 212/18
[52] U.S. Cl. .................. 427/255.6; 427/385.5; 427/372.2; 526/243
[58] Field of Search .................. 526/243, 285, 245; 427/255.6, 372.2, 385.5, 285

[56] References Cited

U.S. PATENT DOCUMENTS 3,457,156  7/1969  Fisher .................. 526/285
3,822,134  7/1974  Rasch et al. .................. 427/255.6

FOREIGN PATENT DOCUMENTS 1145263  3/1969  United Kingdom .................. 526/243

OTHER PUBLICATIONS

Journal of Fluorine Chem., Oct. 1982, vol. 21, Kovacena et al., pp. 261–264.
Norris, W. P. and Finnegan, W. G., J. Org. Chem. 1966, 31, 3292.
Bruce M. I. and Cullen, W. R., Fluorine Chemistry Reviews 1969, 4, 79.

*Primary Examiner*—Joseph L. Schofer
*Assistant Examiner*—Peter F. Kulkosky
*Attorney, Agent, or Firm*—Robert F. Beers; William T. Ellis; Thomas E. McDonnell

[57] ABSTRACT

A double substitution of pentafluorsulfur on diacetylene by a reaction of diacetylene with pentafluoro sulfur bromide, followed by a dehydrobromineaction with potassium hydroxide. The substituted diacetylene polymerizes in the liquid and gas phases. The polymer is useful as a coating and surface-treatment agent.

2 Claims, No Drawings

BIS(PENTAFLUOROSULFUR)DIACETYLENE POLYMER THEREFROM AND PREPARATIONS THEREOF

BACKGROUND OF THE INVENTION

The invention pertains generally to fluoro-substitution of unsaturated compounds and in particular to double fluorosubstitution of acetylene compounds.

The substitution of hydrogen by fluorine in organic molecules influences various properties and stabilize many molecular structures. Improvement of oxidative, thermal, and hydrolytic properties of such partially or totally fluorniated materials is well documented.

Fluorination of highly reactive unsaturated compounds, e.g. acetylenes, is very difficult to control. Acetylenic and diacetylenic compounds polymerize spontaneously at room temperature and below, and as a result, stabilized monomer compounds of such fluorinated derivatives are not readily attainable in yields considered to be practical.

No direct methods to prepare mono- or di-substituted derivates are known. Indirect methods involving multi-step coupling reactions of the acetylenic fragments have been used to prepare symmetrical derivates of diacetylene. Examples of fluorinated diacetylene prepared in this manner are disclosed in Norris, W. P. and Finnegan, W. G. *J. Org. Chem.* 1966, 31, 3292 and Bruce M. I. and Cullen, W. R. *Fluorine Chemistry Reviews* 1969, 4, 79. Those methods have many steps and yield mixtures of coupled products.

SUMMARY OF THE INVENTION

It is, therefore, an object of this invention to improve the oxidative, thermal, and hydrolytic properties of diacetylene compounds.

Another object of this invention is to substitute two perfluoro groups, in a controlled manner, on diacetylene compounds to produce monomers capable of polymerizing to fluorinated unsaturated polymers.

A further object of this invention is to prepare fluorinated unsaturated polymers.

These and other objects are achieved by a double controlled substitution of sulfur pentafluoro bromide on diacetylene followed by a dehydrobromination of the substituted diacetylene with potassium hydroxide. Polymerization in the liquid phase proceeds at a temperature low enough to avoid detonation. Polymerization can proceed in the vapor phase.

DETAILED DESCRIPTION OF THE INVENTION

The controlled substitution of two pentafluorosulfur groups ($SF_5$) for the terminal hydrogens of diacetylene is achieved by the following reaction sequence:

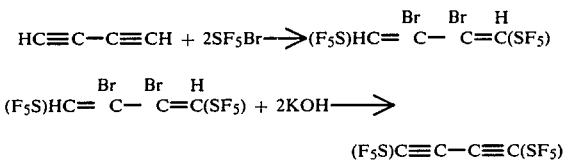

$$HC\equiv C-C\equiv CH + 2SF_5Br \longrightarrow (F_5S)HC=\overset{Br}{C}-\overset{Br}{C}=\overset{H}{C}(SF_5)$$

$$(F_5S)HC=\overset{Br}{C}-\overset{Br}{C}=\overset{H}{C}(SF_5) + 2KOH \longrightarrow$$

$$(F_5S)C\equiv C-C\equiv C(SF_5)$$

For the first step, the reactants are admitted into a reactor as liquids at a temperature not higher than about $-70°$ C. The temperature limitation arise, because of the instability of the reactants. Sulfur pentafluoro bromide decomposes at temperatures above $-70°$ C. unless additional precautions are taken, such as the one described later. However, double substitution requires a temperature higher than $-70°$ C. for a practical reaction rate. Accordingly, the reaction temperature is from about $-60°$ to about $-40°$ C. and preferably from $-50°$ to $-40°$ C. The yield is reduced by the unwanted bromination of the unsaturated bonds by the bromine resulting from the decomposition of sulfur pentafluoride bromide. Diacetylene violently polymerizes at temperatures higher than $-30°$ C. The reactor is preferably closed due to the volatility of the reactants and products.

The reaction temperature can be raised, if sulfur pentafluoro bromide is stabilized. It has been determined that purging the reactor with fluorine gas at a temperature of at least about 90° C., preferably from about 90° C. to about 130° C., and most preferably from 100° C. to 125° C. for at least about 30 minutes and preferably at least one hour. Purges longer than 1½ hours are not preferred because the longer purge time does not result in any improvement. If a fluorine purge is used in order to obtain a higher reaction temperature, the reactor and associated equipment should be constructed from material which is inert to fluorine, e.g. stainless steel. The higher temperature range is from about $-50°$ to $-30°$ C. and preferably from $-45°$ to $-35°$ C.

The two reactants can be mixed stoichiometric in an $SF_5Br:C_4H_2$ mole ratio of 2:1, but preferably with an excess of up to 15 mole percent of sulfur pentafluoride bromide, and most preferably with an excess from 7 to 12 mole percent of the bromide reactant.

After the reaction is complete, it is preferred that the adduct intermediate is separated from the reactor. The preferred separation technique is fractional distillation at about $-25°$ to 25° C. and preferably at $-25°$ to $-10°$ C.

The final step is dehydrobromination of the adduct with potassium hydroxide. The reaction requires an extremely strong base; thus potassium hydroxide is added dry. The rate of addition must be such that the exothermic dehydrobromination reaction does not cause the reaction mixture to exceed 70° C. and preferably 60° C. It is possible to carry out the dehydrobromination at a temperature as low as 10° C. Preferably the temperature is from 20° to 50° C. In order to ensure that dehydrobromination is complete, an excess of potassium hydroxide is used. The preferred excess is from 25 to 100 mole percent of stoichiometry. Bis(pentafluorosulfur)diacetylene can be isolated by any of the standard techniques, e.g. vacuum distillation, so long as the temperature does not exceed 70° C. and preferably 60° C.

The invention having been described in general the following examples are given by way of illustration and are not meant to limit this disclosure or the claims to follow in any manner.

EXAMPLE I

Preparation of $(SF_5)_2C_4$

The disubstituted adduct $F_5SC(H)=C(Br)-C(Br)=C(H)SF_5$ (III) was prepared in a 50% yield by reacting a 2:1 mole ratio of $SF_5Br$ and $HC\equiv C-C\equiv CH$, respectively, at $-45°$. This compound was a clear liquid with a vapor pressure of much less than 1 Torr at 25° and was removed from the reaction vessel with a syringe after pumping away the volatile fractions. Attempts to further purify this material by gas chromatography and fractional distillation under vacuum were unsuccessful due to a thermally induced reaction. The $^1$H NMR spectrum contained only one quintet pattern indicating each proton was coupled to a separate SF$_5$— group and equivalent. The $^{19}$F NMR spectrum contained only one AB$_4$ pattern indicative of equivalent SF$_5$ groups. Based on the NMR spectra, the purity of (III) was estimated to be better than 95%. The structure assignment was supported by the liquid phase infrared spectrum which contained an olefinic C—H stretch, (3105 cm$^{-1}$(m)), a weak C=C stretch, (1668 cm$^{-1}$(w)), S—F stretches (930 and 840 cm$^{-1}$ (vs)) and an S—F deformation (600 cm$^{-1}$ (s)). Other infrared absorptions at 1590 (w), 1320 (w), 1280 (w), 1068 (w), 1017 (m), 720 (m), 645 (m) and 578 cm$^{-1}$ (m) were unassigned. The $^1$H NMR spectrum contained a regular quintet ($\delta$=6.85 ppm, J=7.5 Hz) and the $^{19}$F NMR spectrum[5] contained an AB$_4$ pattern ($\delta_A$= −62.2; $\delta_B$= −70.0 ppm; J=135.4 Hz). The mass spectral fragmentation pattern (reported for Br$^{79}$) contained clusters for 1 or 2 bromines as indicated, and a parent-ion at m/e=462, together with the following fragments; m/e=443 (S$_2$F$_9$C$_4$H$_2$Br$_2$+), 382 (S$_2$F$_{10}$C$_4$HBr+), 335 (SF$_5$C$_4$H$_2$Br$_2$+), 208 (C$_4$H$_2$Br$_2$+), 186 (SF$_2$C$_3$HBr+), 166 (SFC$_3$Br+), 158 (Br$_2$+), 147 (SC$_3$Br+), 128 (C$_4$HBr+), 127 (SF$_5$+), 89 (SF$_3$+), 70 (SF$_2$+).

Dehydrobromination of (III) by excess KOH proceeded readily at 25° C. resulting in a yield of approximately 50% for the bis(pentafluorosulfur)diacetylene, SF$_5$C≡C—C≡CSF$_5$ (IV). Identification of the clear, liquid compound was corroborated by gas phase molecular weight measurements (found, 298; theory, 302) and spectroscopic data. The gas phase infrared spectrum has a medium absorption at 2180 cm$^{-1}$ ($\nu$(C≡C)) and very strong S—F bands at 920, 890, 620 and 600 cm$^{-1}$. The $^{19}$F NMR spectrum in Freon-11 contained only one AB$_4$ pattern ($\delta_A$= −66.4 and $\delta_B$= −77.0 ppm; J$_{AB}$=169.2 H$_Z$) which was consistent with equivalent SF$_5$ groups. The mass spectral fragmentation pattern contained a strong parent ion at m/e=302, together with major fragments at m/e=283 (S$_2$F$_9$C$_4$+), 175 (SF$_5$C$_4$+), 137 (SF$_3$C$_4$+), 127 (SF$_5$+), 118 (SF$_2$C$_4$+), 89 (SF$_3$+), 86 (F$_2$C$_4$+), 80 (SC$_4$+), 70 (SF$_2$+), 67 (FC$_4$+), 44 (SC+) and 31 (CF+). The experimentally determined vapor pressure equation, log p$_{(mm)}$=7.80−(1860/T), yielded an extrapolated boiling point of 105°, $\Delta$H$_{vap}$ of 8.51 kcal/mol, and $\Delta$S$_{vap}$ of 22.5 eu. The density of the liquid was measured as 1.72 y/cc at 25° compared to 0.7364 g/cc (0°)[6] for diacetylene.

EXAMPLE II

Improved Stability of SF$_5$Br by Fluorine Purge

A stainless steel Hoke gas cylinder was filled with fluorine and heated at 120° C. for 45 minutes. The fluorine was removed and the cylinder was filled with sulfur pentafluro bromide. The filled cylinder was stored at room temperature for more than one year. To date, no decomposition of sulfur pentafluoro bromide has been detected.

Bis(pentafluorosulfur)diacetylene can polymerize into highly useful polymers. The di-substituted monomer is not prone to explosive polymerization, but is more difficult to polymerize. The polymer from the di-substituted monomer is not explosive, unlike the polymer from the mono-substituted monomer. The main use of the polymer, however, is the surface treatment of a wide range of materials. This polymer, due to its surprising adhesiveness can import fluoropolymer properties to a wide range of materials.

The polymer can be represented by the formula:

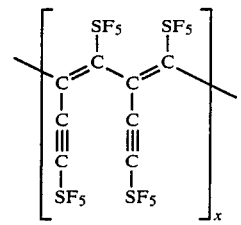

wherein x represents the average number of repeating units and has a value up to 12. Polymers with x equal to 5 to 8 are extremely useful and easily prepared.

The monomer can be polymerized in the liquid phase by maintaining the temperature of the polymer from about 70° to 100° C. and preferably from 75° to 85° C. The preferred polymerization technique is to contact a surface to vapors of the monomer, causing the monomer to polymerize on the surfaces. Sufficient vapors can be generated by maintaining the monomer at a temperature from about 55° to 75° C. and preferably from 60° to 70° C., by placing the monomer in a vacuum, by admitting the liquid monomer into the chamber drop wise or as a aerosol, and by spraying the monomer on a heated surface. The following examples are given to illustrate the two techniques for polymerizing the subject monomer.

EXAMPLE III

Liquid Phase Polymerization

Poly(SF$_5$C$_4$SF$_5$). Approximately 5 mmol of monomer was condensed into a 5-mm o.d×15 mm long Pyrex NMR tube and the tube was sealed. When the sample was left overnight at room temperature, a dark bronze, nonviscous liquid formed. The tube was then placed in an oil bath heated to 80° C. for approximately 12 h, giving a totally solidified matrix. After cooling to room temperature, the tube was opened under a vacuum to remove trace quantities of gas, which was identified as monomer by IR.

The polymer was characterized by spectroscopic and physical property measurements. The mass spectrum of the polymer contained no significant peaks above m/e 151 (SF$_5$C$_2$+) and was predominated by SF$_5$ cleavage fragments. The molecular weight of the polymer was determined by vapor phase osmometry (VPO) techniques using hexafluoro-m-xylene as a solvent. The extrapolated molecular weight was 2200 and corresponds to approximately 7.3 repeat units. A $^{19}$F NMR spectrum gave a very weak resonance and suggested the presence of paramagnetism in the material. The ESR of the neat polymer was a multiplet having a g value of 2.0027. The calculated spin desnity was 2×10$^{15}$ spins/g or approximately 1 spin/10$^6$ repeat units. The XPS spectrum of the solid indicated sulfur, carbon, and fluorine to be the only elements present and the sulfur to fluorine ratio was 2.5:10. The thermal stability of the polymer was determined by thermal gravimetric analysis in a nitrogen atmosphere. With a heating rate of 10°/min, a 10% weight loss was observed at 177° C. and continued to a 50% loss at 315° C. An analysis of the volatile materials indicated that cleavage of the SF$_5$ group occurred to give SF$_4$.

EXAMPLE IV

Vapor Phase Polymerization on Polymers

The vapor phase polymerizations onto polymer surfaces were conducted by placing samples of weighed, commercially available polymers into a 1 liter Pyrex flask equipped with a 12/30 standard taper joint and a stopcock. The polymer samples were then exposed to the monomer vapors for varying times, then removed from the vessel and weighed to determine the relative amount of polymerization on each samples as a function of time.

Due to the low volatility of this monomer, the vessel was equipped with a side-arm that was used to contain a reservoir of monomer and ensure that a measurable quantity of monomer could polymerize on the surfaces. The polymer surfaces were limited to PTFE and FEP, and due to polymerization of the excess monomer in the side-arm, the reaction time was limited to approximately 2 weeks. The weight gain of each polymer was approximately 4%.

The IR spectrum of poly(SF$_5$C$_4$SF$_5$) was also obtained by subtractive IR techniques. The principal bands were found at 2160 (s, $\gamma$(C≡C)), and 900 cm$^{-1}$ (S, $\gamma$(SF$_4$)).

The effect of the subject polymer on the surface properties of other polymers was determined by measuring the critical surface tension of the neat host polymer and the host polymer with the subject polymer. The following example is given to illustrate this:

EXAMPLE V

Critical Surface Tension

The critical surface tension was measured using a series of n-alkanes with known surface tension values. The surface tension for the alkane was plotted against the cosine of the measured contact angle. The critical surface tension is defined as the surface tension that corresponds to cos $\theta = 1$, and this means that any liquid with a lower surface tension will completely wet the surface of the polymer. The critical surface tension (dyn/cm) for poly((SF$_5$)$_2$C$_4$) on FEP was 20.4. In comparision to typical polymers, the wettability of the SF$_5$-containing polymers is much lower than PE (critical surface tension of 31.0) but higher than FEP or PTFE (critical surface tension of each is 18.0).

Increasing the wettability of especially PTFE is significant due to the corresponding increase in the capability of PTFE to adhere to surfaces. Decreasing the wettability of nonfluorinated polymers, e.g. polythylene, establishes that the vapor polymerization of the subject monomers is a simple technique to impart fluoropolymer properties to non-fluorinated polymers.

The present polymers can coat nonpolymeric surfaces, e.g. glass. Example VI is given to illustrate that aspect of the present invention.

EXAMPLE VI

Coating Glass with Poly(SF$_5$)$_2$C$_4$

A round bottom glass flask was evacuated by vacuum and partially refilled with mono(pentafluorosulfur)diacetylene. The flask was kept at 62° C. for three days, turning the flask golden. Testing the coating showed that the coating had strongly adhered to glass.

The ability of the subject polymer to coat glass and similar materials may provide a simple means and technique for passivating surfaces from e.g. fluorine, fluorine-containing compounds, and reactions involving those materials.

As has been demonstrated, the placement of an SF$_5$ group on diacetylene provides a simple way of improving the stability of diacetylenes and the producing of fluorinated monomer capable altering a wide variety of surfaces by polymerizing thereon. The polymer coating produced by this monomer is especially important as a protective coating and a means for altering surface properties of a wide range of materials. The double substituted monomer is more difficult to polymerize than the corresponding single substituted monomer, on the other hand, it is more stable and not subject to detonation.

Obviously, many modifications and variations of the present invention are possible in light of the above teachings. It is therefore to be understood that, within the scope of the appended claims, the invention may be practiced otherwise than as specifically described.

What is claimed is:

1. A method of coating poly bis(pentafluorosulfur)diacetylene on a surface which comprises vaporizing bis(pentafluorosulfur)diacetylene to a gas at a temperature from about 55° to about 75° C. and exposing said surface to said gas until sufficient bis(pentafluorosulfur)diacetylene has polymerized on said surface.

2. The method of claim 1 wherein said temperature is from 60° C. to 70° C.

* * * * *